US008458877B1

(12) United States Patent
Falconette

(10) Patent No.: US 8,458,877 B1
(45) Date of Patent: Jun. 11, 2013

(54) AIR HOSE REMOVAL TOOL

(76) Inventor: Edgardo A. Falconette, Doral, FL (US)

( * ) Notice: Subject to any disclaimer, the term of this patent is extended or adjusted under 35 U.S.C. 154(b) by 0 days.

(21) Appl. No.: 13/409,427

(22) Filed: Mar. 1, 2012

(51) Int. Cl.
*B23P 19/04* (2006.01)
*B25B 27/10* (2006.01)
*B25B 7/02* (2006.01)
*B25B 27/14* (2006.01)

(52) U.S. Cl.
USPC .................. 29/237; 29/268; 29/229; 81/423; 81/9.3

(58) Field of Classification Search
USPC ............... 29/237, 239, 229, 268; 81/423, 9.3, 81/325
See application file for complete search history.

(56) References Cited

U.S. PATENT DOCUMENTS

| | | | | |
|---|---|---|---|---|
| 2,677,982 | A * | 5/1954 | Arras et al. | 81/9.3 |
| 3,176,551 | A * | 4/1965 | Hansen | 81/423 |
| 3,571,894 | A * | 3/1971 | Bilka | 29/229 |
| 4,571,808 | A * | 2/1986 | King | 29/268 |
| 5,077,879 | A * | 1/1992 | Haviv | 29/268 |
| 5,282,302 | A * | 2/1994 | Starks et al. | 29/268 |
| 5,495,651 | A | 3/1996 | Tsuha | |
| 5,507,206 | A | 4/1996 | Solski | |
| 5,537,727 | A * | 7/1996 | Mayer | 29/237 |
| 5,566,438 | A * | 10/1996 | Bullock | 29/237 |
| 5,865,072 | A * | 2/1999 | Jerdee | 81/9.3 |
| 5,901,736 | A * | 5/1999 | McCauley et al. | 137/231 |
| 5,979,032 | A * | 11/1999 | Roy et al. | 29/237 |
| D429,614 | S | 8/2000 | Ploeger | |
| 6,736,031 | B1 * | 5/2004 | Kang | 81/9.3 |
| 6,941,626 | B2 | 9/2005 | Johnson, Jr. et al. | |
| 6,957,478 | B1 | 10/2005 | Ontiveros | |
| 7,127,787 | B2 | 10/2006 | Whitehead | |
| D572,552 | S * | 7/2008 | Feliciano | D8/52 |
| 7,730,598 | B2 | 6/2010 | Kurtz | |
| 8,151,618 | B2 * | 4/2012 | Polofsky | 72/409.16 |
| 2002/0083802 | A1 * | 7/2002 | Steinweg | 81/325 |

* cited by examiner

*Primary Examiner* — Lee D Wilson
*Assistant Examiner* — Alvin Grant

(57) ABSTRACT

An air hose removal device for removing a hose from a push-to-connect (quick connect push-in) fitting comprises a first lever arm and a second lever arm. The device comprises a generally planar rigid upper fork located on a second lever arm anterior end having a "V" shaped notch. The device comprises a generally planar rigid lower fork mount located on a second lever arm anterior end having a slot that runs longitudinally with respect to the plane of operation of the first lever arm and the second lever arm. The device comprises a rigid lower fork attachment with a "V" shaped notch and a threaded stud located on a lower fork attachment bottom surface that further comprises a mated internally threaded knob. The lower fork attachment comprises a monolithic "vee" block located on a lower fork attachment top surface having a groove located in the "vee" block top surface.

6 Claims, 3 Drawing Sheets

AIR HOSE REMOVAL TOOL

BACKGROUND OF THE INVENTION

Lever based tools have been used for many years and are often seen in a common form of pliers. Because of the versatility and function of lever based tools, there are many variations including adaptations for specialty tools for various, specific applications. The present invention teaches a lever based tool for quickly and easily removing an air hose from a push-to-connect fitting.

SUMMARY

The present invention features an air hose removal device for removing a hose from a push-to-connect (quick connect push-in) fitting. In some embodiments the device comprises a first lever arm and a second lever arm. In some embodiments, the second lever arm is pivotally connected to the first lever arm via a connecting pin located through a first lever arm connecting aperture and a second lever arm connecting aperture.

In some embodiments, the device comprises a generally planar rigid upper fork located on a second lever arm anterior end. In some embodiments, the upper fork comprises a "V" shaped notch. In some embodiments, the device comprises a generally planar rigid lower fork mount located on a first lever arm anterior end. In some embodiments, the lower fork mount comprises a slot that runs longitudinally with respect to the plane of operation of the first lever arm and the second lever arm.

In some embodiments, the device comprises a rigid lower fork attachment. In some embodiments the lower fork attachment comprises a "V" shaped notch. In some embodiments, the lower fork attachment comprises a threaded stud located on a lower fork attachment bottom surface that further comprises a mated internally threaded knob. In some embodiments, the lower fork attachment comprises a monolithic "vee" block located on a lower fork attachment top surface. In some embodiments, the "vee" block comprises a groove located in the "vee" block top surface.

In some embodiments, in a first position of rest the first lever arm posterior end is located away from the second lever arm posterior end and the first lever arm anterior end is located away from the second lever arm anterior end. In some embodiments, in a first position, the air hose removal device can be placed into a position of use with respect to a push-to-connect fitting. In some embodiments, in a second position the first lever arm posterior end is moved toward the second lever arm posterior end and the first lever arm anterior end subsequently moves toward the second lever arm anterior end. In some embodiments, upon movement to the second position, the push-to-connect fitting ends are compressed to release an air hose.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figures 1, 2:
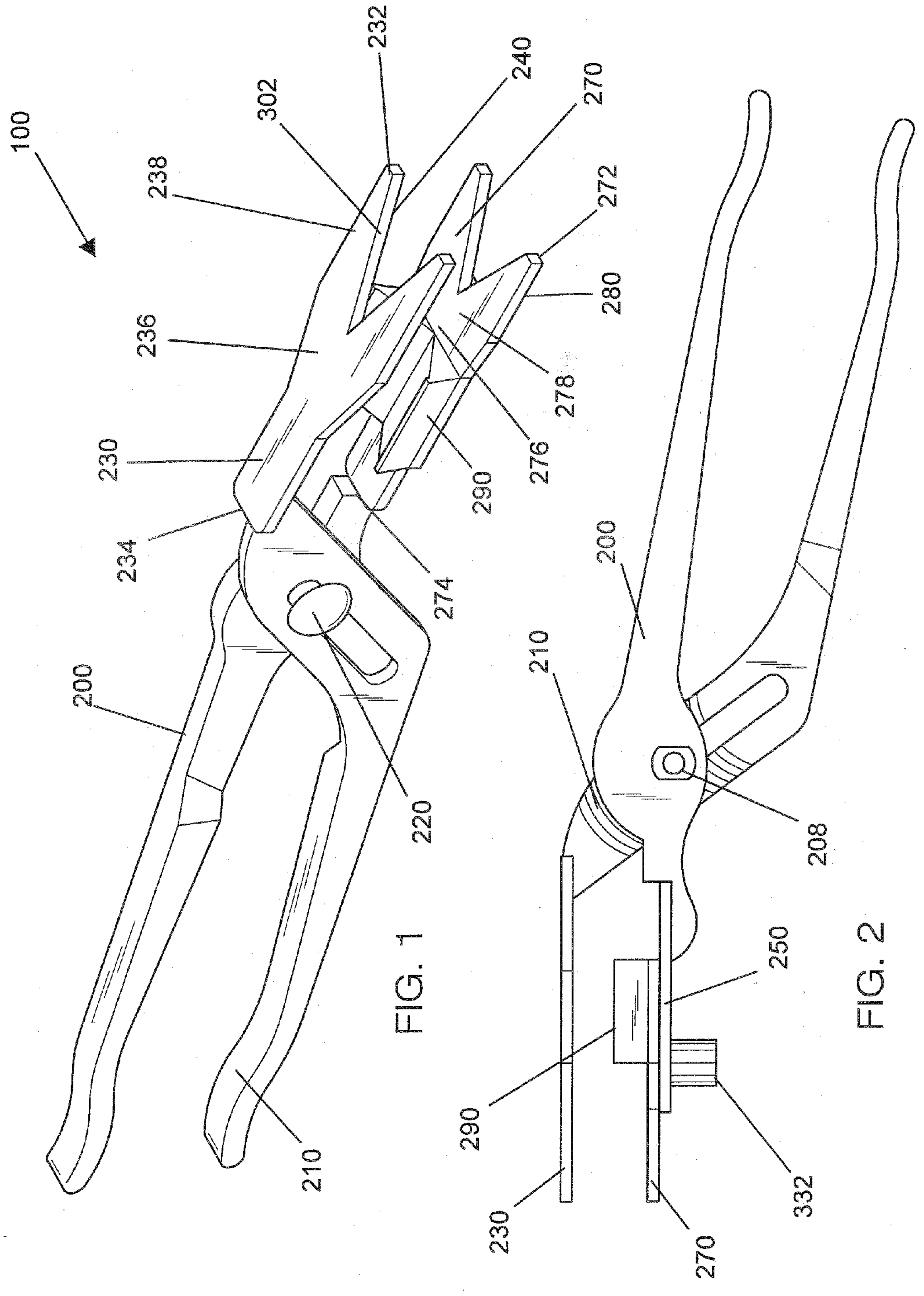
FIG. 1 is a perspective view of the present invention.
FIG. 2 is a side view of the present invention with the lower fork attachment first edge facing outward.
Figure 3:
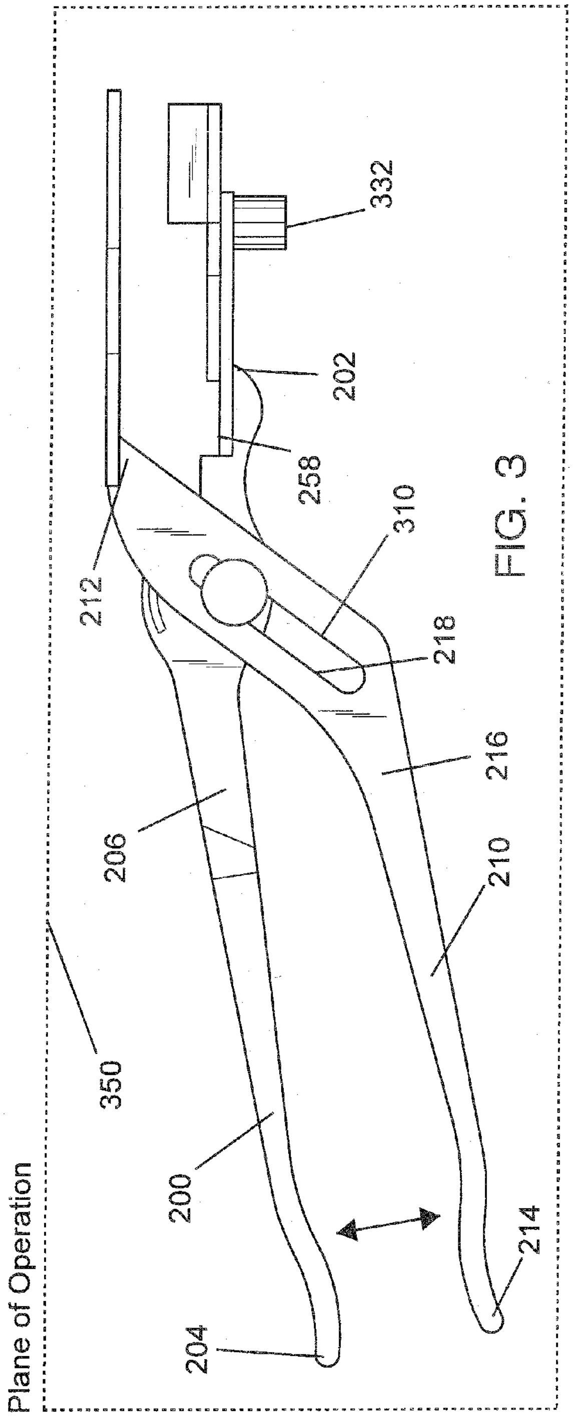
FIG. 3 is a side view of the present invention with the lower fork attachment second edge facing outward.
Figure 4:
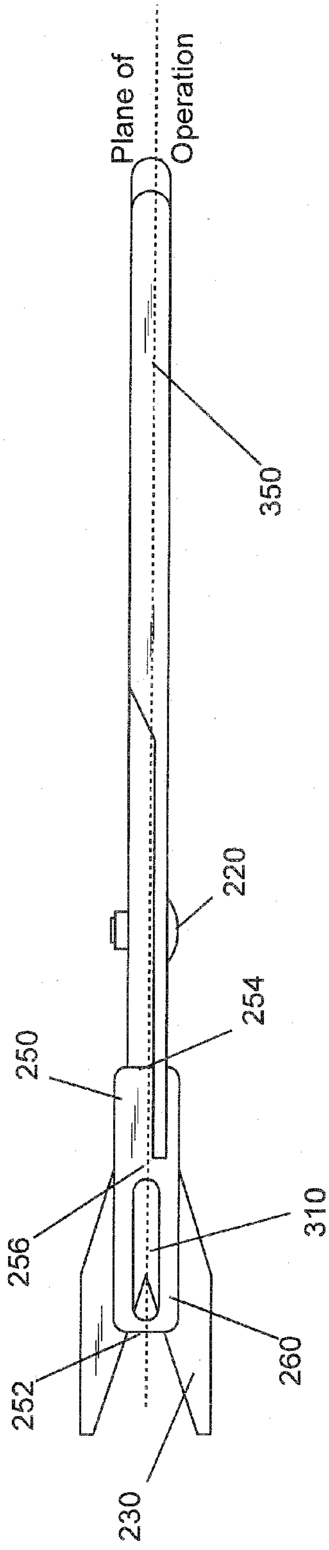
FIG. 4 is a bottom view of the present invention without the lower fork attachment.
Figure 5:
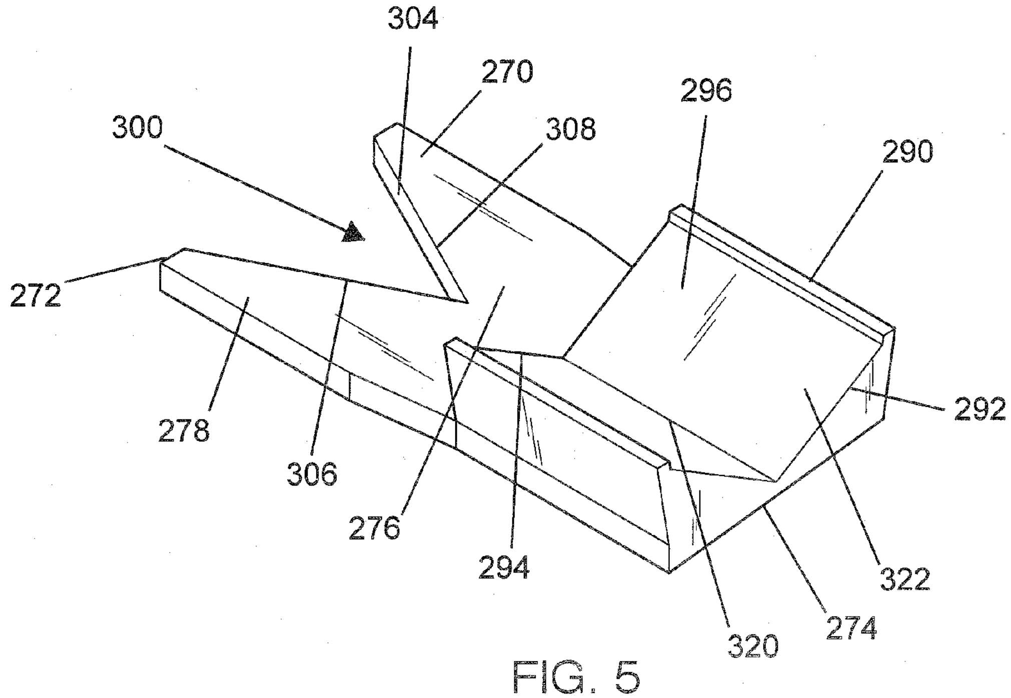
FIG. 5 is a perspective view of the lower fork attachment of the present invention.
Figure 6:
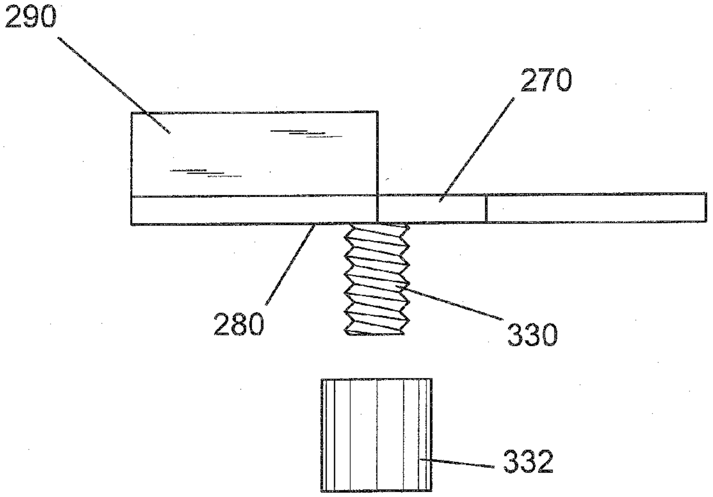
FIG. 6 is a side view of the lower fork attachment of the present invention.

Following is a list of elements corresponding to a particular element referred to herein:

100 Air hose removal device
200 First lever arm
202 First lever arm anterior end
204 First lever arm posterior end
206 First lever arm middle region
208 First lever arm connecting aperture
210 Second lever arm
212 Second lever arm anterior end
214 Second lever arm posterior end
216 Second lever arm middle region
218 Second lever arm connecting aperture
220 Connecting pin
230 Upper fork
232 Upper fork anterior edge
234 Upper fork posterior edge
236 Upper fork middle region
238 Upper fork top surface
240 Upper fork bottom surface
250 Lower fork mount
252 Lower fork mount anterior edge
254 Lower fork mount posterior edge
256 Lower fork mount middle region
258 Lower fork mount top surface
260 Lower fork mount bottom surface
270 Lower fork attachment
272 Lower fork attachment first edge
274 Lower fork attachment second edge
276 Lower fork attachment middle region
278 Lower fork attachment top surface
280 Lower fork attachment bottom surface
290 "Vee" block
292 "Vee" block anterior edge
294 "Vee" block posterior edge
296 "Vee" block top surface
300 Notch
302 Upper fork cross-section
304 Lower fork attachment cross-section
306 Notch first side edge
308 Notch second side edge
310 Slot
320 Groove
322 Non-slip lining
330 Threaded stud
332 Threaded knob
350 Plane of operation Referring now to FIGS. 1-6, the present invention features an air hose removal device (100) for removing an air hose from a push-to-connect (quick connect push-in) fitting. In some embodiments, the device (100) comprises a first lever arm (200) having a first lever arm anterior end (202), a first lever arm posterior end (204), a first lever arm middle region (206) between the first lever arm anterior end (202) and the first lever arm posterior end (204), and a first lever arm connecting aperture (208) located at the first lever arm middle region (206).

In some embodiments, the device (100) comprises a second lever arm (210) having a second lever arm anterior end (212), a second lever arm posterior end (214), a second lever arm middle region (216) between the second lever arm anterior end (212) and the second lever arm posterior end (214), and a second lever arm connecting aperture (218) located at the second lever arm middle region (216). In some embodiments, the second lever arm (210) is pivotally connected to the first lever arm (200) via a connecting pin (220) located through the first lever arm connecting aperture (208) and the second lever arm connecting aperture (218).

In some embodiments, the device (100) comprises a generally planar rigid upper fork (230) having a upper fork anterior edge (232), an upper fork posterior edge (234) opposite the upper fork anterior edge (232), an upper fork middle region (236), an upper fork top surface (238), and an upper fork bottom surface (240). In some embodiments, the upper fork (230) is located on the second lever arm anterior end (212). In some embodiments, the upper fork top surface (238) is oriented perpendicularly with respect to the plane of operation (350) of the first lever arm (200) and the second lever arm (210). In some embodiments, the upper fork (230) comprises a "V" shaped notch (300) having a widest opening originating at the upper fork anterior edge (232) and tapering to a point near the upper fork middle region (236). In some embodiments, the notch (300) is located on the upper fork top surface (238) and extends through an upper fork cross-section (302) to the upper fork bottom surface (240).

In some embodiments the upper fork (230) is about ⅛" thick. In some embodiments the upper fork (230) is about ¼" thick. In some embodiments the upper fork (230) is greater than ¼" thick.

In some embodiments, the device (100) comprises a generally planar rigid lower fork mount (250) having a lower fork mount anterior edge (252), a lower fork mount posterior edge (254) opposite the lower fork mount anterior edge (252), a lower fork mount middle region (256), a lower fork mount top surface (258) and a lower fork mount bottom surface (260). In some embodiments, the lower fork mount (250) is located on the first lever arm anterior end (202). In some embodiments, the lower fork mount (250) is oriented in line with respect to the plane of operation (350) of the first lever arm (200) and the second lever arm (210). In some embodiments, the lower fork mount (250) comprises a slot (310). In some embodiments, the slot (310) runs longitudinally with respect to the plane of operation (350) of the first lever arm (200) and the second lever arm (210). In some embodiments, the slot (310) is located originating proximal to but not connecting with the lower fork mount anterior edge (252) and extending to a point near the lower fork mount middle region (256).

In some embodiments, the device (100) comprises a rigid lower fork attachment (270) having a lower fork attachment first edge (272), a lower fork attachment second edge (274) opposite the lower fork attachment first edge (272), a lower fork attachment middle region (276), a lower fork attachment top surface (278) and a lower fork attachment bottom surface (280). In some embodiments, the lower fork top surface is oriented perpendicularly with respect to the plane of operation (350) of the first lever arm (200) and the second lever arm (210). In some embodiments, the lower fork attachment (270) comprises a "V" shaped notch (300) having a widest opening originating at the lower fork attachment first edge (272) and tapering to a point near the lower fork attachment middle region (276). In some embodiments, the notch (300) is located on the lower fork attachment top surface (278) and extends through a lower fork attachment cross-section (304) to the lower fork attachment bottom surface (280).

In some embodiments the lower fork attachment (270) is about ⅛" thick. In some embodiments the lower fork attachment (270) is about ¼" thick. In some embodiments the lower fork attachment (270) is greater than ¼" thick.

In some embodiments, the lower fork attachment (270) comprises a threaded stud (330) located proximal to the lower fork attachment middle region (276) on the lower fork attachment bottom surface (280). In some embodiments, the threaded stud (330) comprises a mated internally threaded knob (332).

In some embodiments, the lower fork attachment (270) comprises a monolithic "vee" block (290) located on the lower fork attachment top surface (278). In some embodiments, the "vee" block (290) has a "vee" block anterior edge (292), a "vee" block posterior edge (294) and a "vee" block top surface (296). In some embodiments, the "vee" block (290) is located at the lower fork attachment second edge (274) and extends to the lower fork attachment middle region (276). In some embodiments, the "vee" block (290) comprises a groove (320) located in the "vee" block top surface (296). In some embodiments, the groove (320) traverses the "vee" block top surface (296) from the "vee" block anterior edge to the "vee" block posterior edge (294).

In some embodiments, the threaded stud (330) is for connecting the lower fork attachment (270) to the lower fork mount (250). In some embodiments, the threaded stud (330) is located through the slot (310). In some embodiments, the threaded knob (332) is located on the threaded stud (330) and tightened to affix the lower fork attachment (270) into place.

In some embodiments, in a first position of rest the first lever arm posterior end (204) is located away from the second lever arm posterior end (214) and the first lever arm anterior end (202) is located away from the second lever arm anterior end (212). In some embodiments, in a first position, the air hose removal device can be engaged into position with respect to a push-to-connect fitting. In some embodiments, in a second position of use the first lever arm posterior end (204) is located toward the second lever arm posterior end (214) and the first lever arm anterior end (202) is located toward the second lever arm anterior end (212). In some embodiments, upon movement to the second position, the push-to-connect fitting ends are compressed to release an air hose.

In some embodiments, two push-to-connect fitting ends can be actuated to simultaneously release two air hoses. In some embodiments, one push-to-connect fitting end can be actuated to release an air hose.

In some embodiments, the first lever arm connecting aperture (208) is a slot (310). In some embodiments, the second lever arm connecting aperture (218) is a slot (310).

In some embodiments, the groove (320) comprises flat sides. In some embodiments, the groove (320) comprises a 60 degree included angle.

In some embodiments, the groove (320) comprises a non-slip lining (322). In some embodiments, the non-slip lining (322) is a rubber.

In some embodiments, the "V" notch (300) comprises a radius. In some embodiments, the "V" notch (300) comprises stepped increments on a notch first side edge (306) and a notch second side edge (308).

As used herein, the term "about" refers to plus or minus 10% of the referenced number. For example, an embodiment wherein the device is about 10 inches in length includes a device that is between 9 and 11 inches in length.

The disclosures of the following U.S. Patents are incorporated in their entirety by reference herein: U.S. Pat. No. 5,495,651; U.S. Pat. No. 5,507,206; U.S. Pat. No. 5,537,727; U.S. Pat. No. 6,941,626; U.S. Pat. No. 6,957,478; U.S. Pat. No. 7,127,787; U.S. Pat. No. 7,730,598; U.S. Design Pat. No. 429,614.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An air hose removal device (100) for removing an air hose from a push-to-connect (quick connect push-in) fitting comprising:

(a) a first lever arm (200) having a first lever arm anterior end (202), a first lever arm posterior end (204), a first lever arm middle region (206) between the first lever arm anterior end (202) and the first lever arm posterior end (204), and a first lever arm connecting aperture (208) disposed at the first lever arm middle region (206);

(b) a second lever arm (210) having a second lever arm anterior end (212), a second lever arm posterior end (214), a second lever arm middle region (216) between the second lever arm anterior end (212) and the second lever arm posterior end (214), and a second lever arm connecting aperture (218) disposed at the second lever arm middle region (216), wherein the second lever arm (210) is pivotally connected to the first lever arm (200) via a connecting pin (220) disposed through the first lever arm connecting aperture (208) and the second lever arm connecting aperture (218);

(c) a generally planar rigid upper fork (230) having a upper fork anterior edge (232), an upper fork posterior edge (234) opposite the upper fork anterior edge (232), an upper fork middle region (236), an upper fork top surface (238), and an upper fork bottom surface (240), wherein the upper fork (230) is disposed on the second lever arm anterior end (212), wherein the upper fork top surface (238) is oriented perpendicularly with respect to a plane of operation (350) of the first lever arm (200) and the second lever arm (210), wherein the upper fork (230) comprises a "V" shaped notch (300) having a widest opening originating at the upper fork anterior edge (232) and tapering to a point near the upper fork middle region (236), wherein the notch (300) is disposed on the upper fork top surface (238) and extends through an upper fork cross-section (302) to the upper fork bottom surface (240);

(d) a generally planar rigid lower fork mount (250) having a lower fork mount anterior edge (252), a lower fork mount posterior edge (254) opposite the lower fork mount anterior edge (252), a lower fork mount middle region (256), a lower fork mount top surface (258) and a lower fork mount bottom surface (260), wherein the lower fork mount (250) is disposed on the first lever arm anterior end (202), wherein the lower fork mount (250) is oriented in line with respect to the plane of operation (350) of the first lever arm (200) and the second lever arm (210), wherein the lower fork mount (250) comprises a slot (310), wherein the slot (310) runs longitudinally with respect to the plane of operation (350) of the first lever arm (200) and the second lever, arm (210), wherein the slot (310) is disposed originating proximal to but not connecting with the lower fork mount anterior edge (252) and extending to a point near the lower fork mount middle region (256);

(e) a rigid lower fork attachment (270) having a lower fork attachment first edge (272), a lower fork attachment second edge (274) opposite the lower fork attachment first edge (272), a lower fork attachment middle region (276), a lower fork attachment top surface (278) and a lower fork attachment bottom surface (280), wherein the lower fork attachment top surface (278) is oriented perpendicularly with respect to the plane of operation (350) of the first lever arm (200) and the second lever arm (210), wherein the lower fork attachment (270) comprises a "V" shaped notch (300) having a widest opening originating at the lower fork attachment first edge (272) and tapering to a point near the lower fork attachment middle region (276), wherein the notch (300) is disposed on the lower fork attachment top surface (278) and extends through a lower fork attachment cross-section (304) to the lower fork attachment bottom surface (280), wherein the lower fork attachment (270) comprises a threaded stud (330) disposed proximal to the lower fork attachment middle region (276) on the lower fork attachment bottom surface (280), wherein the threaded stud (330) comprises a mated internally threaded knob (332), wherein the lower fork attachment (270) comprises a monolithic "vee" block (290) disposed on the lower fork attachment top surface (278), wherein the "vee" block (290) has a "vee" block anterior edge (292), a "vee" block posterior edge (294) and a "vee" block top surface (296), wherein the "vee" block (290) is disposed at the lower fork attachment second edge (274) and extends to the lower fork attachment middle region (276), wherein the "vee" block (290) comprises a groove (320) disposed in the "vee" block top surface (296), wherein the groove (320) traverses the "vee" block top surface (296) from the "vee" block anterior edge (292) to the "vee" block posterior edge (294), wherein the threaded stud (330) is for connecting the lower fork attachment (270) to the lower fork mount (250), wherein the threaded stud (330) is disposed through the slot (310), wherein the threaded knob (332) is disposed on the threaded stud (330) and tightened to affix the lower fork attachment (270) into place, wherein in a first position of rest the first lever arm posterior end (204) is disposed away from the second lever arm posterior end (214) and the first lever arm anterior end (202) is disposed away from the second lever arm anterior end (212), wherein in the first position, the air hose removal device can be engaged into position with respect to a push-to-connect fitting, wherein in a second position of use the first lever arm posterior end (204) is disposed toward the second lever arm posterior end (214) and the first lever arm anterior end (202) is disposed toward the second lever arm anterior end (212), wherein upon movement to the second position, the push-to-connect fitting ends are compressed to release an air hose.

2. The device of claim 1, wherein the groove (320) comprises flat sides.

3. The device of claim 1, wherein the groove (320) comprises a 60 degree included angle.

4. The device of claim 1, wherein the groove (320) comprises a non-slip lining (322).

5. The device of claim 1, wherein the "V" notch (300) comprises a radius.

6. The device of claim 1, wherein the "V" notch (300) comprises stepped increments on a notch first side edge (306) and a notch second side edge (308).

* * * * *